(12) United States Patent
Einberg et al.

(10) Patent No.: US 12,174,926 B2
(45) Date of Patent: Dec. 24, 2024

(54) DETERMINING A MATCHING LIST FOR BIOMETRIC MATCHING

(71) Applicant: ASSA ABLOY AB, Stockholm (SE)

(72) Inventors: Fredrik Einberg, Huddinge (SE); Fredrik Lindersson, Täby (SE)

(73) Assignee: ASSA ABLOY AB, Stockholm (SE)

( * ) Notice: Subject to any disclaimer, the term of this patent is extended or adjusted under 35 U.S.C. 154(b) by 765 days.

(21) Appl. No.: 17/273,207

(22) PCT Filed: Sep. 17, 2019

(86) PCT No.: PCT/EP2019/074914
§ 371 (c)(1),
(2) Date: Mar. 3, 2021

(87) PCT Pub. No.: WO2020/058293
PCT Pub. Date: Mar. 26, 2020

(65) Prior Publication Data
US 2021/0326424 A1 Oct. 21, 2021

(30) Foreign Application Priority Data
Sep. 18, 2018 (SE) .................................... 1851102-2

(51) Int. Cl.
*G06F 21/32* (2013.01)
*G06F 21/35* (2013.01)
(Continued)

(52) U.S. Cl.
CPC .............. *G06F 21/32* (2013.01); *G06F 21/35* (2013.01); *G06V 10/25* (2022.01); *G06V 40/172* (2022.01);
(Continued)

(58) Field of Classification Search
CPC .......... G06F 21/32; G06F 21/35; G06V 10/25; G06V 40/172; G07C 9/10; G07C 9/257; G07C 2209/63; H04B 17/318; E06B 11/08
(Continued)

(56) References Cited

U.S. PATENT DOCUMENTS

2013/0251216 A1 9/2013 Smowton et al.
2014/0015978 A1 1/2014 Smith
(Continued)

FOREIGN PATENT DOCUMENTS

CN 104468179 3/2015
CN 107533776 1/2018
(Continued)

OTHER PUBLICATIONS

International Search Report and Written Opinion for International (PCT) Patent Application No. PCT/EP2019/074914, dated Dec. 10, 2019, 16 pages.
(Continued)

*Primary Examiner* — Jeffrey C Pwu
*Assistant Examiner* — Nega Woldemariam
(74) *Attorney, Agent, or Firm* — Schwegman Lundberg & Woessner, P.A.

(57) ABSTRACT

It is provided a method for selectively granting access to a physical space secured by a barrier. The method is performed in a credential evaluator and comprises the steps of: determining a matching list containing a strict subset of credential identifiers of credentials within range of an antenna provided in a proximity of the barrier, wherein the matching list is based on how long each credential has been within range of the antenna; obtaining a set of biometric templates, consisting of biometric templates respectively associated with the credential identifiers of the matching list;
(Continued)

obtaining biometric data of a person being closest to the barrier; and wherein a positive match between biometric data and one of the biometric templates is a necessary condition for granting access to the physical space.

11 Claims, 4 Drawing Sheets

(51) Int. Cl.
    *G06V 10/25*     (2022.01)
    *G06V 40/16*     (2022.01)
    *G07C 9/10*     (2020.01)
    *G07C 9/25*     (2020.01)
    *H04B 17/318*     (2015.01)

(52) U.S. Cl.
    CPC ............... *G07C 9/10* (2020.01); *G07C 9/257* (2020.01); *H04B 17/318* (2015.01)

(58) Field of Classification Search
    USPC ........................................................ 713/186
    See application file for complete search history.

(56) References Cited

U.S. PATENT DOCUMENTS

| | | | |
|---|---|---|---|
| 2015/0221151 A1 | 8/2015 | Bacco et al. | |
| 2015/0227923 A1 | 8/2015 | Kutsch et al. | |
| 2018/0107880 A1* | 4/2018 | Danielsson | G08B 13/194 |
| 2019/0206158 A1* | 7/2019 | Xu | G06V 40/172 |

FOREIGN PATENT DOCUMENTS

| | | |
|---|---|---|
| CN | 107992797 | 5/2018 |
| CN | 108182414 | 6/2018 |
| JP | 2002-279455 | 9/2002 |
| TW | I 526953 | 3/2016 |
| WO | WO 2017/151859 | 9/2017 |
| WO | WO 2018/025086 | 2/2018 |

OTHER PUBLICATIONS

Second Written Opinion for International (PCT) Patent Application No. PCT/EP2019/074914, dated Aug. 20, 2020, 8 pages.
International Preliminary Report on Patentability for International (PCT) Patent Application No. PCT/EP2019/074914, dated Dec. 11, 2020, 17 pages.
English Translation of Official Action for China Patent Application No. 201980058598.0, dated Mar. 30, 2022, 8 pages.
"International Application Serial No. PCT EP2019 074914, Response to Written Opinion filed Jul. 15, 2020 to Written Opinion mailed Dec. 10, 2019", 7 pgs.
"International Application Serial No. PCT EP2019 074914, International Preliminary Report on Patentability mailed Dec. 11, 2020", 9 pgs.

\* cited by examiner

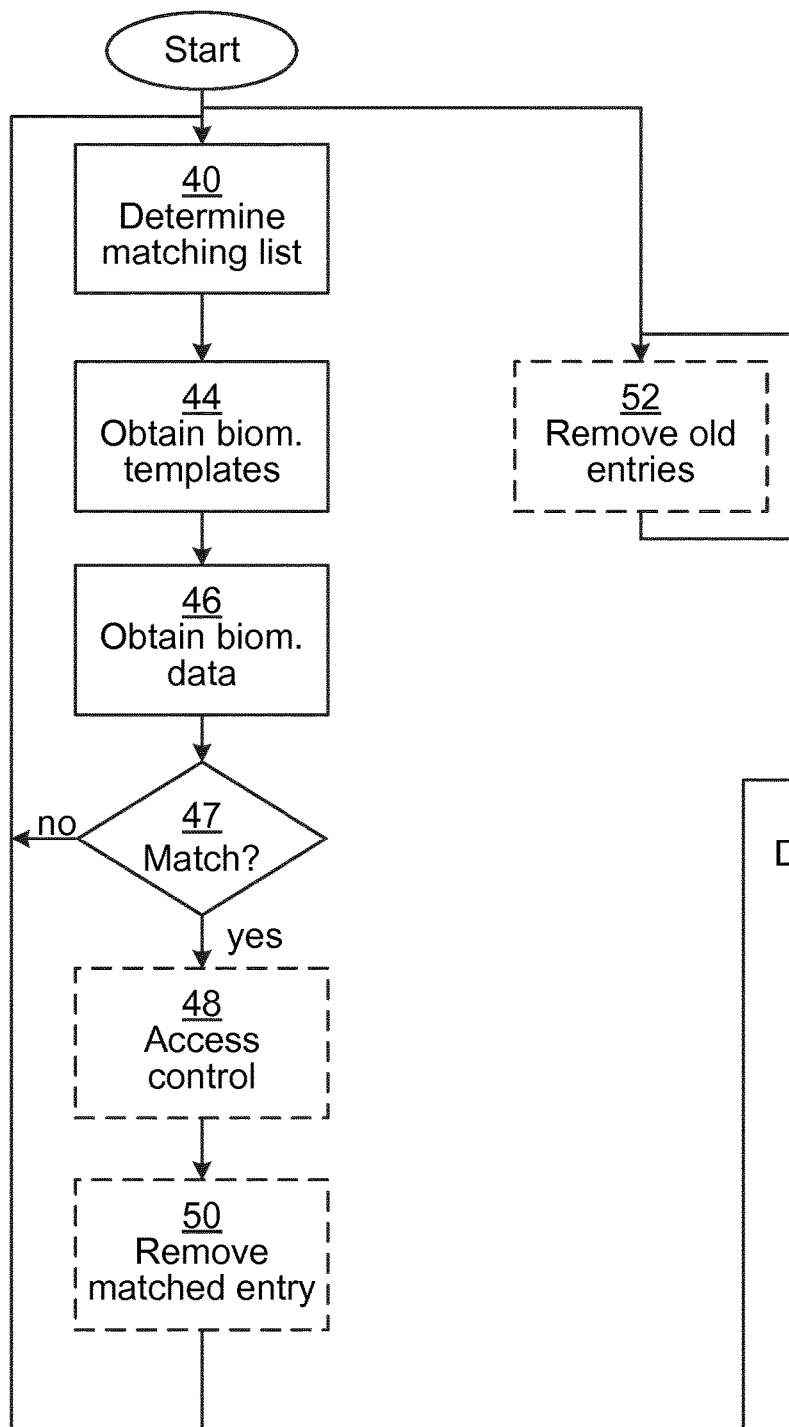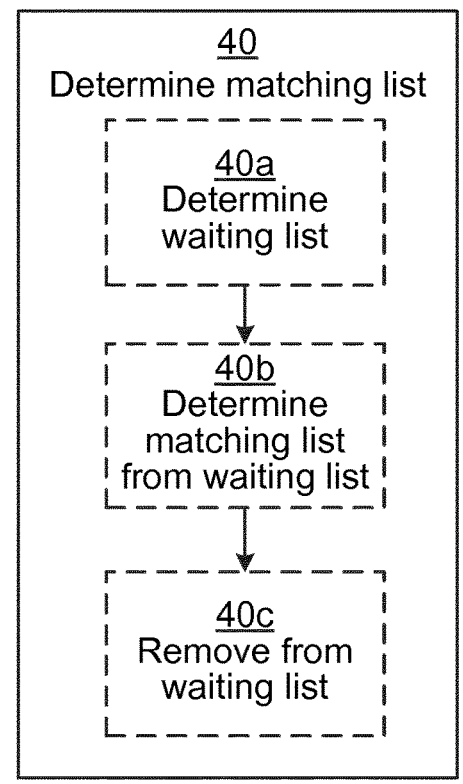
Fig. 3A
Fig. 3B

DETERMINING A MATCHING LIST FOR BIOMETRIC MATCHING

CROSS REFERENCE TO RELATED APPLICATIONS

This application is a national stage application under 35 U.S.C. 371 and claims the benefit of PCT Application No. PCT/EP2019/074914 having an international filing date of Sep. 17, 2019, which designated the United States, which PCT application claimed the benefit of Swedish Patent Application No. 1851102-2 filed Sep. 18, 2018, the disclosure of each of which are incorporated herein by reference.

TECHNICAL FIELD

The invention relates to a method, a credential evaluator, a computer program and a computer program product for determining a matching list for biometric matching. The biometric matching is used to determine a credential associated with the person closest to a barrier, for subsequent access control to a physical space.

BACKGROUND

Locks have evolved from traditional mechanical locks to electronic locks. Electronic locks are becoming increasingly popular for several reasons, such as flexibility, control, user experience and auditing capabilities.

The communication with key devices can occur using any suitable protocol, including wireless communication. This allows, in some cases, the key device to remain in a pocket or a purse during the access control, which significantly simplifies the user experience.

However, when there are multiple users within communication range of the lock, the lock needs to ensure that access control is based on the key device of the user by the lock, and not with another key device, e.g. one which is behind in a queue to enter.

WO 2018/025086 A1 discloses an access control system along with a method for operating the system. In one example, a system and method are disclosed that provide a hands-free solution thereby enabling a user to walk through a door or portal with no stop in motion and limited to no interaction or user effort. Security of the system is still maintained even though user interactions are significantly decreased. A combination of RF credentials, RF based positioning and biometrics are used.

Hence, it is known to use biometric matching in combination with RF credentials. However, in situations where there are a large number of key devices in communication range of the lock, any improvement in the matching against biometric templates is of great benefit.

US 20150221151 discloses methods and systems configured to detect and guarantee identity for the purpose of data protection and access control. JP 2002279455 discloses an automatic ticket examination machine.

SUMMARY

It is an object to reduce the risk of false positives in situations where biometric matching is used to determine with which entity to communicate for wireless authentication.

According to a first aspect, it is provided a method for selectively granting access to a physical space secured by a barrier. The method is performed in a credential evaluator and comprises the steps of: determining a matching list containing a strict subset of credential identifiers of credentials within range of an antenna provided in a proximity of the barrier, wherein the matching list is based on how long each credential has been within range of the antenna; obtaining a set of biometric templates, consisting of biometric templates respectively associated with the credential identifiers of the matching list; obtaining biometric data of a person being closest to the barrier; and wherein a positive match between biometric data and one of the biometric templates is a necessary condition for granting access to the physical space.

The step of determining a matching list may comprise determining a matching list comprising a plurality of entries when at least three credentials are within range of the antenna.

The method may further comprise the step of: removing, when access control results in granted access, the entry in the matching list associated with the matching biometric template.

The step of determining a matching list may comprise: determining a waiting list containing credential identifiers of credentials within range of the antenna; determining the matching list as a predetermined number of credential identifiers from the waiting list, having been within range the longest; and removing, for each entry in the matching list, the corresponding entry in the waiting list.

The method may further comprise a step of: removing each entry from the matching list having been in the list longer than a predetermined time period.

In the step of determining a matching list, the matching list may also be based on received signal strength at the antenna for each device comprising the credential.

The method may further comprise the step, prior to the step of determining a matching list, of: performing access control for all credentials in range.

The method may further comprise the step, performed when a positive match between biometric data and one of the biometric templates has been determined, of: performing access control for a credential associated with the person.

According to a second aspect, it is provided a credential evaluator for selectively granting access to a physical space secured by a barrier. The credential evaluator comprises: a processor; and a memory storing instructions that, when executed by the processor, cause the credential evaluator to: determine a matching list containing a strict subset of credential identifiers of credentials within range of an antenna provided in a proximity of the barrier, wherein the matching list is based on how long each credential has been within range of the antenna; obtain a set of biometric templates, consisting of biometric templates respectively associated with the credential identifiers of the matching list; obtain biometric data of a person being closest to the barrier; and proceed with access control when biometric data matches one of the biometric templates, the access control being based on the credential identifier associated with the matching biometric template.

The instructions to determine a matching list may comprise instructions that, when executed by the processor, cause the credential evaluator to determine a matching list comprising a plurality of entries when at least three credentials are within range of the antenna.

The credential evaluator may further comprise instructions that, when executed by the processor, cause the credential evaluator to: remove, when access control results in granted access, the entry in the matching list associated with the matching biometric template.

The instructions to determine a matching list may comprise instructions that, when executed by the processor, cause the credential evaluator to: determine a waiting list containing credential identifiers of credentials within range of the antenna; determine the matching list as a predetermined number of credential identifiers from the waiting list, having been within range the longest; and remove, for each entry in the matching list, the corresponding entry in the waiting list.

The credential evaluator may further comprise instructions that, when executed by the processor, cause the credential evaluator to: remove each entry from the matching list having been in the list longer than a predetermined time period.

The matching list may also be based on received signal strength at the antenna for each device comprising the credential.

According to a third aspect, it is provided a computer program for selectively granting access to a physical space secured by a barrier. The computer program comprises computer program code which, when run on a credential evaluator causes the credential evaluator to: determine a matching list containing a strict subset of credential identifiers of credentials within range of an antenna provided in a proximity of the barrier, wherein the matching list is based on how long each credential has been within range of the antenna; obtain a set of biometric templates, consisting of biometric templates respectively associated with the credential identifiers of the matching list; obtain biometric data of a person being closest to the barrier; and proceed with access control when the biometric data matches one of the biometric templates, the access control being based on the credential identifier associated with the matching biometric template.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 3A-3C are flow charts illustrating embodiments of methods for selectively granting access to a physical space secured by a barrier;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

According to embodiments herein, the number of potential matches for biometric matching, used in a credential evaluator, is reduced to reduce the risk of false positives in the biometric matching. Biometric data of a person closest to a barrier is matched only against a set of biometric templates of a matching list. The matching list is a strict subset of all credentials within range of the credential evaluator. Specifically, the matching list is determined based on how long each credential has been within range.

Figure 1:
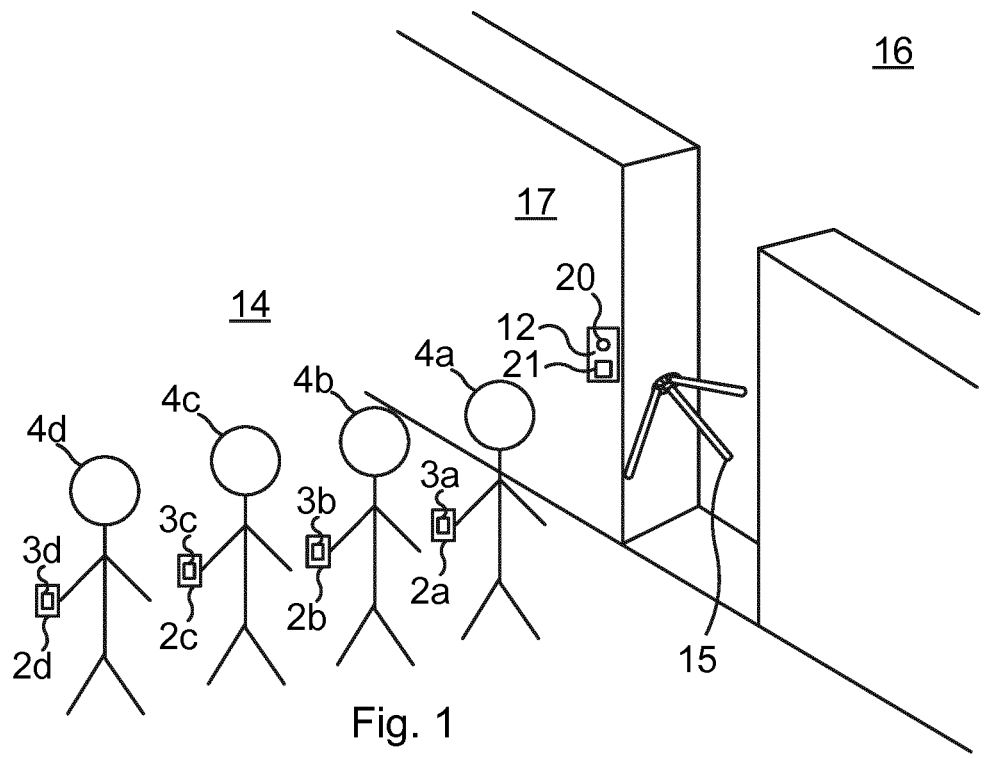
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, turnstile, hatch, cabinet door, drawer, window, etc. In order to control access to the physical space 16, by selectively unlocking the barrier 15, a credential evaluator 12 is provided. The credential evaluator 12 comprises an electronically controllable lock. Optionally, the electronically controllable lock is provided external to the credential evaluator 12. The electronically controllable lock is controllable by the credential evaluator 12 to be in a locked state or in an unlocked state to thereby control access to the restricted physical space.

The credential evaluator 12 communicates wirelessly with key devices 2a-d of respective users (people) 4a-d. Any suitable wireless protocol can be used, e.g. Bluetooth or Bluetooth Low Energy (BLE), ZigBee, any of the IEEE 802.11x standards (also known as WiFi), etc. Each key device 2a-d contains one or more respective credentials 3a-d. The credential can be in any suitable form, e.g. as BLE identifiers. The wireless communication in the credential evaluator relies on an antenna 21.

In the embodiment shown in FIG. 1, biometric matching is performed in the form of face recognition based on the biometric data being an image depicting one or more faces. It is to be noted that the concepts presented are equally applicable for any other type of known or future biometry, e.g. retina recognition, infrared signature recognition, iris recognition, gait recognition, etc.

Using biometry, it is difficult to provide a secure solution if there are many users enrolled in the system. In general, biometrics of today are not suitable for identification or 1:N matching if N is large, where N is the number of biometric templates against which biometric data is matched. In an environment with a large number of users, such as an office, N can easily grow beyond 1000, which significantly reduces security. According to embodiments presented herein, N is significantly reduced to increase security, even when the number of users is large.

It is to be noted, that in this situation, the biometry is used for identification, i.e. finding a match of biometric match in a pool of N biometric templates, i.e. 1:N matching. Another use of biometry is verification, when it is verified if biometric data match a particular biometric template, i.e. 1:1 matching.

A first user 4a with a first key device 2a is closest to the barrier 15. However, two or more of the key devices 2a-d may be within communication range of the antenna 21. Consider a scenario where the first credential 3a of the first key device 2a should not be granted access, but the second credential 3b of the second key device 2b is to be granted access. It is thus desired that the credential evaluator 12 only determines access for the user of the first key device 2a and not of the second key device 2b. For this to occur, there is a camera 20, internal or external to the credential evaluator 12, is provided which captures an image comprising the face of the person closest to the camera 20.

The face of the person closest to the camera 20 is then matched against a set of face templates. Each face template is associated with a credential identifier. In this way, the credential evaluator 12 only determines access for the key device having the credential associated with the recognised face of the person closest to the camera 20. In this case, the face of the person closest to the camera 20 is matched with a face template which is associated with the first credential 3a. The credential evaluator 12 thus communicates with the key device 2a having the first credential 3a. If there is no match in the face recognition, the credential evaluator does not communicate with any key devices until a new face is presented which results in a match in the face templates.

Once a face is recognised, the associated credential is authenticated and found to have authorisation, the barrier 15 is unlocked to thereby grant access to the restricted physical space 16. It is to be noted that the authentication (and authorisation) of the credential can occur prior to or after the biometric matching.

Figure 2:
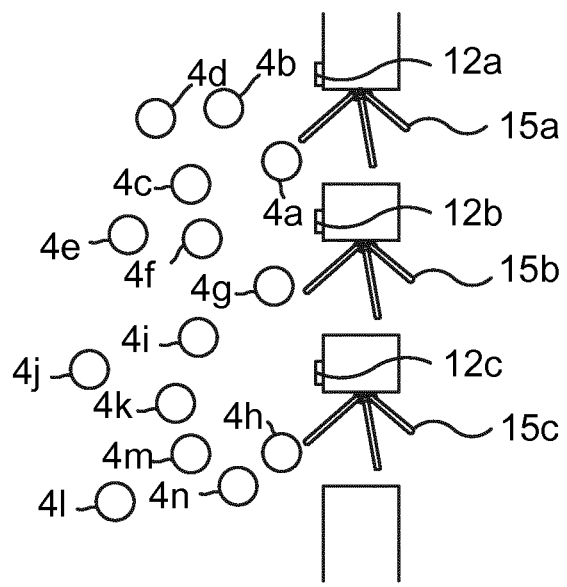
FIG. 2 is a schematic top view diagram illustrating a situation similar to what is shown in FIG. 1, but with several barriers and more people.

FIG. 2 is a schematic top view diagram illustrating a situation similar to what is shown in FIG. 1, but with several barriers and more people. In this scenario, there are three barriers 15a-c with respective credential evaluators 12a-c. In this example there are fourteen people 4a-n with respective key devices and credentials (not shown).

Prior to the situation of FIG. 2, users need to be enrolled in the system. In enrollment, the biometric template for the user is created and stored. For instance, in an illustrative face recognition example, an image of the face of the user may be captured at an enrollment station (e.g., a front desk or with security personnel). The image (or potentially multiple images) may then be converted into a facial template that is wrapped with a layer of encryption. This encrypted facial template may then be issued and stored on an appropriate access control credential or in a central location.

The number of key devices and credentials within communication range of the credential evaluators 12a-c can be large, up to several dozens or even hundreds. If all biometric templates associated with credentials within range were to form part of the set of biometric templates to match a person closest to a barrier, the risk for false positives increases greatly. In biometry, a rate of false positives is also known as False Acceptance Rate (FAR) or False Positive Identification Rate (FPIR). This would not only be a problem in that an unauthorised person is given access, but also that the person associated with the (wrongful) entry might not be given access if the access control is a one-time entry, such as for tickets to concerts or sports events.

Hence, according to embodiments presented herein, only a strict subset of biometric templates associated with credentials within range form part of the set of biometric templates used for biometric recognition. The subset is formed based on how long each credential has been within biometric range, as explained in more detail below. By reducing the number of biometric templates, the risk of false positives is greatly reduced.

Figure 3C:
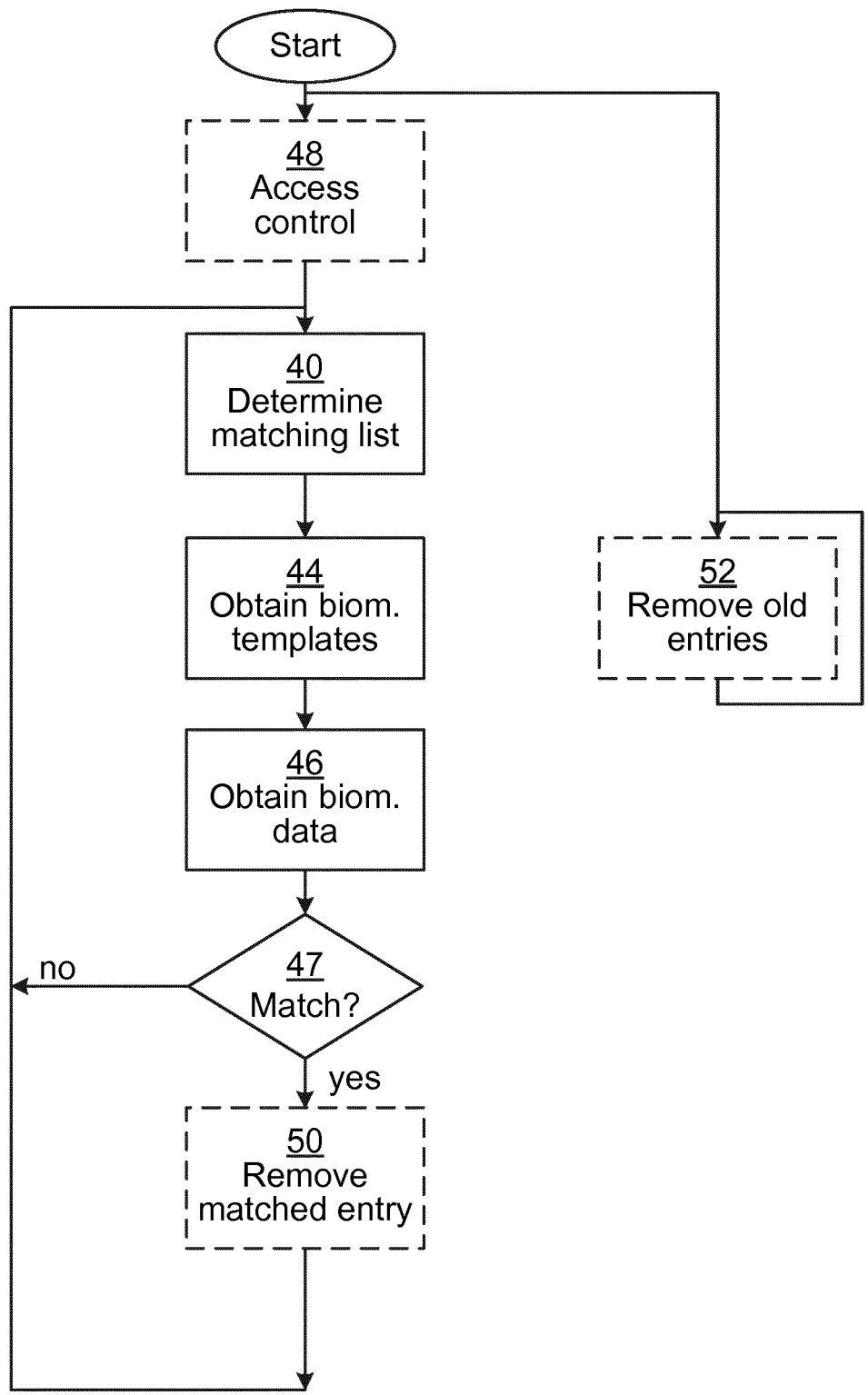

FIGS. 3A-3C are flow charts illustrating embodiments of methods for selectively granting access to a physical space secured by a barrier based on biometric matching. The methods are performed in the credential evaluator. The biometric matching can be based on any type of known or future biometry, e.g. face recognition, retina recognition, infrared signature recognition, iris recognition, gait recognition, etc.

In a determine matching list step 40, the credential evaluator determines a matching list. The matching list is a strict subset of credential identifiers of credentials within range of an antenna provided in proximity of the barrier. The matching list is based on how long (i.e. duration of time) each credential has been within range of the antenna. Specifically, the matching list can contain those credentials which have been within range the longest. The (maximum) number of entries in the matching list can be configured. The more entries there are in the matching list, the more time subsequent biometric matching will take.

This step can comprise determining a matching list comprising a plurality of entries. In other words, the matching list comprises at least two entries (when at least three credentials are within range and the matching list is a strict subset of credentials within range).

In one embodiment, the matching list is also based on received signal strength at the antenna for each device comprising the credential. For instance, a credential of a key device with very high RSSI might be added to the matching list even if the time from when the credential entered into range was relatively short. This solves a situation where some parts of a crowded queue move faster than others. Also, this embodiment solves a situation of slow-moving queue where a credential has been removed from the matching list due to expired time to live (see below) and has now arrived at the barrier.

An effect of the matching list being based on how long each credential has been within range is that a careful balance is achieved between fast biometric matching (due to a limited matching list) and progress of several users (by having a matching list of several entries). The matching list is based on how long each credential has been within range, corresponding to time the person has been in line (i.e. queueing). The matching list can thus contain those entries corresponding to people having been in line the longest, but only e limited number of entries. This solves a problem of achieving fast progress of a large number of users through a lock (since the list contains those entries which are likely to be closest to the lock) while keeping biometric processing times for each user low (by keeping the matching list limited in number of entries).

In an obtain biometric templates step 44, the credential evaluator obtains a set of biometric templates. The set of biometric templates consists of biometric templates respectively associated with the credential identifiers of the matching list. In other words, there is a one-to-one relationship between the biometric templates in the set and entries in the matching list.

In an obtain biometric data step 46, the credential evaluator obtains biometric data of a person being closest to the barrier.

In a conditional match step 47, the credential evaluator determines whether the biometric data matches one of the biometric templates. If this is the case, the method proceeds to an optional access control step 48. Otherwise, the method ends, or returns to the start of the method.

The match can be determined when the biometric data matches one of the biometric templates within an acceptable matching threshold.

In the optional access control step 48, the credential evaluator proceeds with performing access control. The access control is based on the credential identifier associated with the matching template, i.e. with the person of the matching biometric data. The access control can be based on authentication based on wireless communication with the credential. The combination of biometry and the access control in this step provides great security.

In an optional remove matched entry step 50, the credential evaluator removes the entry in the matching list associated with the matching template. This allows a new entry to be added to the matching list in a subsequent iteration of the method to keep the number of entries in the matching list in accordance with configuration.

In a separate execution sequence (separate thread, process, etc.), there is an optional remove old entries step 52. Alternatively, the step can form part of the execution sequence of the other steps. In this step, the credential evaluator removes each entry, from the matching list, having been in the list longer than a predetermined time period. In this way, if a person approaches the barrier and the corresponding credential identifier is added to the matching list, the person may decide to leave without entering, whereby the entry will be removed from the matching list after the predetermined time period (i.e. time to live period).

When the method is applied for multiple barriers, the matching list is optionally shared across all credential evaluators 12*a-c*.

Using this method, the number of entries for the biometric recognition, corresponding to the matching list, is kept low, regardless of how many credentials are within communication range. Still, by including a plurality of entries in the matching list, the process of performing biometric matching (see below) is made more efficient compared to a single entry, since the credential evaluator is ready to match against any of the biometric templates corresponding to the entries in the matching list. In other words, as soon as one the biometric data of one person is used for entry, there are other biometric data entries against which matching is done. Since the entries in the matching list (and thus obtained biometric data) are based on how long the credential has been in range (corresponding to time in line of the respective person), the next person in line can be evaluated quickly and efficiently.

Looking now to FIG. 3B, this is a flow chart illustrating optional sub-steps of the determine matching list step of FIG. 3A.

In an optional determine waiting list step 40*a*, the credential evaluator determines a waiting list containing credential identifiers of credentials within range of the antenna.

In an optional determine matching list from waiting list step 40*b*, the credential evaluator determines the matching list as a predetermined number of credential identifiers from the waiting list. In this way, the credential identifiers which have been within range the longest period of time are ensured to form part of the matching list.

In an optional remove from waiting list step, the credential evaluator removes, for each entry in the matching list, the corresponding entry in the waiting list.

Using steps 40*a-c* over time, entries are added first to the waiting list when the credentials come into communication range, and subsequently to the matching list. In this way, the matching list contains a predetermined number of entries corresponding to credentials having been in range the longest period of time.

By basing the matching list on the duration of each credential have been within range, the matching list can be kept small while still providing a transparent user experience. Reducing the matching list improves security since the biometric matching is performed against a smaller number of potential matches, thus reducing the risk of false positives.

Looking now to FIG. 3C, only new or modified steps compared to the steps of FIG. 3A will be described.

In this embodiment, the optional access control step 48 is performed before the determine matching list step 40. Here, this step comprises authenticating each credential identifier of each credential being in range. In one embodiment, step 48 is executed in a separate execution sequence (separate thread, process, etc.) from the rest of the method.

The combination of biometry and the access control in this step provides great security.

Figure 4:
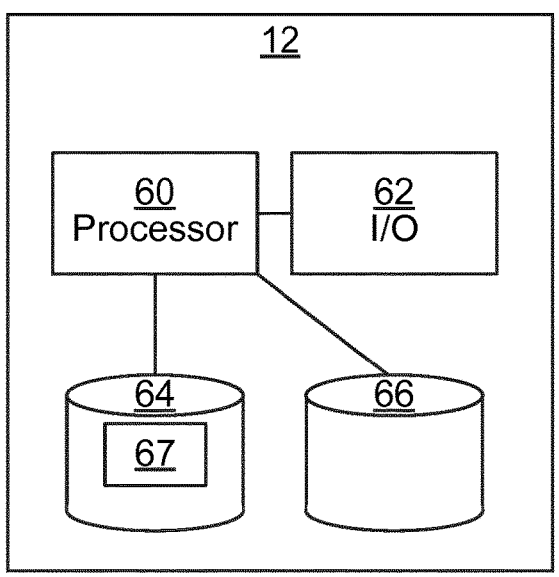
FIG. 4 is a schematic diagram illustrating components of the credential evaluator 12 of FIG. 1.

FIG. 4 is a schematic diagram illustrating components of the credential evaluator 12 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-C above.

The memory 64 can be any combination of random-access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The credential evaluator 12 further comprises an I/O interface 62 for communicating with external and/or internal entities. Optionally, the I/O interface 62 also includes a user interface.

Other components of the credential evaluator 12 are omitted in order not to obscure the concepts presented herein.

Figure 5:
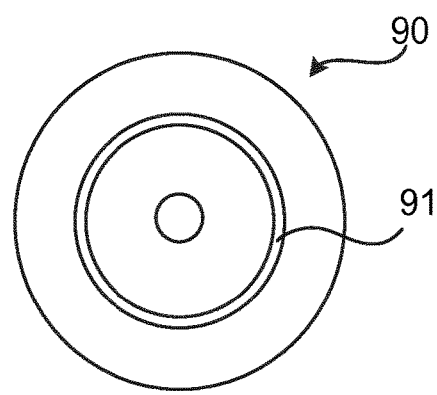
FIG. 5 shows one example of a computer program product 90 comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for selectively granting access to a physical space secured by a barrier, the method being performed in a credential evaluator and comprising:
   determining a matching list containing a strict subset of credential identifiers of credentials within range of an antenna provided in a proximity of the barrier, wherein the matching list is based on how long each credential has been within range of the antenna;
   obtaining a set of biometric templates, consisting of biometric templates respectively associated with the credential identifiers of the matching list; and
   obtaining biometric data of a person being closest to the barrier;
   wherein a positive match between the biometric data and at least one of the biometric templates is a necessary condition for granting access to the physical space; and
   wherein determining the matching list comprises:
      determining a waiting list containing the credential identifiers of the credentials within range of the antenna;
      determining the matching list as a predetermined number of the credential identifiers from the waiting list corresponding to credentials having been within range of the antenna the longest, wherein the matching list comprises a plurality of entries when at least three credentials are within range of the antenna; and
      removing, for each entry in the matching list, a corresponding entry in the waiting list.

2. The method according to claim 1, further comprising:
   removing, when access control results in granted access, an entry in the matching list associated with a biometric template positively matched with the biometric data.

3. The method according to claim 1, further comprising:
   removing each entry from the matching list having been in the matching list longer than a predetermined time period.

4. The method according to claim 1, wherein in determining the matching list, the matching list is also based on received signal strength at the antenna for each device comprising a respective one of the credentials.

5. The method according to claim 1, further comprising, prior to determining the matching list, performing access control for all the credentials within range of the antenna.

6. The method according to claim 1, further comprising, performed when a positive match between the biometric data and at least one of the biometric templates has been determined, performing access control for a credential associated with the person.

7. A credential evaluator for selectively granting access to a physical space secured by a barrier, the credential evaluator comprising:
   a processor; and
   a memory storing instructions that, when executed by the processor, cause the credential evaluator to:
      determine a matching list containing a strict subset of credential identifiers of credentials within range of an antenna provided in a proximity of the barrier, wherein the matching list is based on how long each credential has been within range of the antenna;
      obtain a set of biometric templates, consisting of biometric templates respectively associated with the credential identifiers of the matching list; and
      obtain biometric data of a person being closest to the barrier;
   wherein a positive match between the biometric data and at least one of the biometric templates is a necessary condition for granting access to the physical space; and
   wherein the instructions to determine the matching list comprise instructions that, when executed by the processor, cause the credential evaluator to:
      determine a waiting list containing the credential identifiers of the credentials within range of the antenna;
      determine the matching list as a predetermined number of the credential identifiers from the waiting list corresponding to credentials having been within range of the antenna the longest, wherein the matching list comprises a plurality of entries when at least three credentials are within range of the antenna; and
      remove, for each entry in the matching list, a corresponding entry in the waiting list.

8. The credential evaluator according to claim 7, further comprising instructions that, when executed by the processor, cause the credential evaluator to:
   remove, when access control results in granted access, an entry in the matching list associated with a biometric template positively matched with the biometric data.

9. The credential evaluator according to claim 7, further comprising instructions that, when executed by the processor, cause the credential evaluator to:
   remove each entry from the matching list having been in the matching list longer than a predetermined time period.

10. The credential evaluator according to claim 7, wherein the matching list is also based on received signal strength at the antenna for each device comprising a respective one of the credentials.

11. A non-transitory computer readable medium storing a computer program for selectively granting access to a physical space secured by a barrier, the computer program comprising computer program code which, when run on a credential evaluator, causes the credential evaluator to:
   determine a matching list containing a strict subset of credential identifiers of credentials within range of an antenna provided in a proximity of the barrier, wherein the matching list is based on how long each credential has been within range of the antenna;
   obtain a set of biometric templates, consisting of biometric templates respectively associated with the credential identifiers of the matching list; and
   obtain biometric data of a person being closest to the barrier;
   wherein a positive match between the biometric data and at least one of the biometric templates is a necessary condition for granting access to the physical space; and
   wherein the computer program code to determine the matching list comprises computer program code which, when run on the credential evaluator, causes the credential evaluator to:
      determine a waiting list containing the credential identifiers of the credentials within range of the antenna;
      determine the matching list as a predetermined number of the credential identifiers from the waiting list corresponding to credentials having been within range of the antenna the longest, wherein the matching list comprises a plurality of entries when at least three credentials are within range of the antenna; and remove, for each entry in the matching list, a corresponding entry in the waiting list.

\* \* \* \* \*